Feb. 23, 1971  GUY-NOEL CHAUMONT  3,565,493
TRACK FOR LIGHTWEIGHT VEHICLE
Filed Aug. 23, 1968
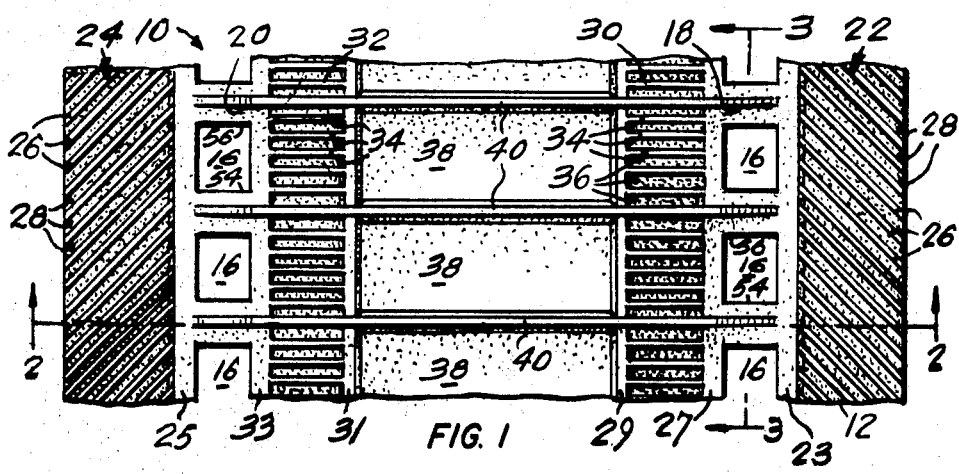
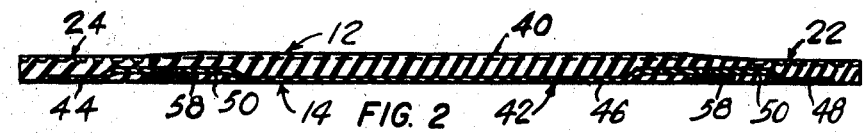
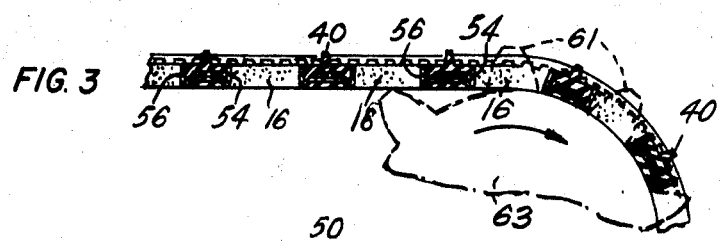
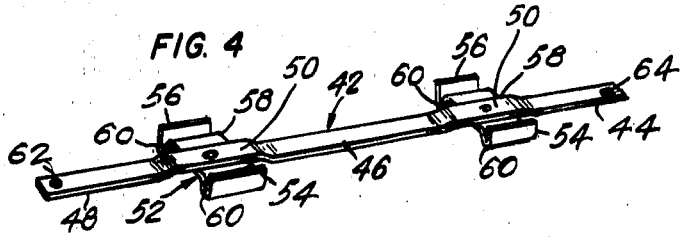
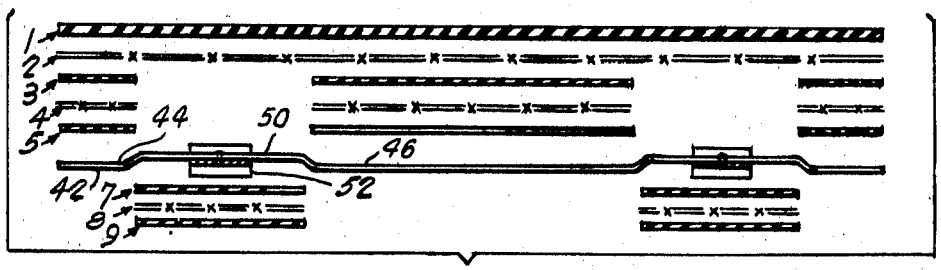
INVENTOR
Guy-Noel CHAUMONT
by Charles E Baxley
Atty

United States Patent Office 3,565,493
Patented Feb. 23, 1971

3,565,493
TRACK FOR LIGHTWEIGHT VEHICLE
Guy-Noel Chaumont, 138 Rue Gaulin,
Princeville, Quebec, Canada
Filed Aug. 23, 1968, Ser. No. 754,895
Claims priority, application Canada, July 25, 1968,
026,011
Int. Cl. B62d 55/24
U.S. Cl. 305—38
6 Claims

ABSTRACT OF THE DISCLOSURE

The present invention comprises a track having a tread surface and an inner peripheral surface, a pair of spaced rows of sprocket receiving holes in said track, reinforcing bars flush with said inner surface and extending laterally of said track, clips secured to said members, said clips forming the front and back surfaces of said holes.

---

The present invention relates to tracks for vehicles more particularly to endless tracks flexible in the peripheral direction but substantially rigid in the lateral direction and suitable to propel lightweight vehicles for travel over snow or the like.

Open lightweight vehicles adapted to transport a few people at a time over snow generally are supplied with one of several types of track. The tracks generally incorporate some form of reinforcing means to rigidify the track in the lateral direction and usually this reinforcement is in the form of laterally extending rods located about mid-thickness of the track.

The present invention provides an improved track reinforced with a specific reinforcing bar and clip structure which lies mainly flush with the inner peripheral surface of the tread, with the clips forming wear surfaces adapted to engage the sprocket teeth.

The present invention also relates to an improved tread design.

Broadly the present invention comprises a track having a tread surface and an inner peripheral surface, a pair of spaced rows of sprocket receiving holes in said track, reinforcing bars flush with said inner surface and extending laterally of said track, clips secured to said members, said clips forming the front and back surfaces of said holes.

Further features will be evident from the detailed description appearing hereinbelow when taken in conjunction with the accompanying drawings in which:

FIG. 1 is a partial plan view of a track constructed according to the present invention;

FIG. 2 is a section along the line 2—2 of FIG. 1;

FIG. 3 is a section along the line 3—3 of FIG. 1 and extended to show the track co-operating with a sprocket wheel shown in dotted lines;

FIG. 4 is a plan view of the reinforcing bar and clips of the instant invention; and FIG. 5 is an exploded view of one form of track incorporating the instant invention.

The track 10 has a tread on outer peripheral surface 12 and a substantially flat inner peripheral surface 14. A pair of spaced rows 18 and 20 of sprocket teeth engaging holes 16 extend through the track 10 and cooperate with the drive sprockets of the vehicle to apply a driving force to the track.

The tread surface 12 has a specific tread design moulded therein. This design comprises a pair of peripheral bands 22 and 24 extending outwardly from the rows 18 and 20 to the adjacent lateral edges of the track and formed by a plurality of lands 26 and grooves 28 extending at an acute angle to the rows 18 and 20, preferably at an angle of about 45°. Longitudinally extending ribs 23 and 25 separate the bands 22 and 24 from the rows 18 and 20 respectively. A second pair of peripheral bands 30 and 32 extend inwardly from the rows 18 and 20 and terminate laterally in longitudinally extending ribs 27, 29 and 31 and 33 respectively. These bands 30 and 32 are narrower than the first bands and are formed of a plurality of lands 34 and grooves 36 extending perpendicular to the rows 18 and 20 and thus transversely of the tread thereby forming gripping protuberances. Between the ribs 29 and 31 the tread surface is formed of substantially flat areas 38 separated by outwardly projecting ridges or ribs 40. These ribs 40 extend laterally of the track 10 between the bands 22 and 24 and traverse the rows 18 and 20 in the spaces between each adjacent pair of the holes 16 in each row. Preferably the ridges or ribs 40 project outwardly from the tread surface 14 further than the lands 26 and 34. If desired suitable metal rods or bars may be embedded in the ridges in any suitable manner, or the ridges may be studded to improve traction.

Incorporated in the track 10 directly beneath each of the ribs or ridges 40 is a reinforcing bar 42. Preferably the reinforcing bar or member 42 is metal and has three flat sections 44, 46 and 48 separated by a pair of raised sections 50 (see FIG. 4). A reinforcing clip 52 is riveted or otherwise secured, for example by welding or being integral with the bar 42, to each section 50. Each clip 52 is substantially W-shaped with a pair of upstanding arms 54 and 56 spaced by and connected to a bridging member 58 which is secured to the raised section 50 of the member 42. The arms 54 and 56 are connected to the bridge member 58 by reverse bent sections 60 projecting inward at the level of the bottom of the flat sections 44, 46 and 48. The double thickness sections 60 reinforce the clip at the point of maximum wear. Suitable holes such as those indicated at 62 and 64 may be provided in the member 42 to position the member 42 during moulding.

The reinforcing members 42 and the reinforcing clips 52 are incorporated into the track 10 as shown in FIGS. 2, 3 and 5 so as to form an integral part therewith. The clips 52 are mounted on the members 42 and these members therefore are oriented in the track so that the arms 54 and 56 and the section 60 form the front and rear surfaces of the sprocket engaging holes 16 in the track. The double thickness sections 60 project further down between the teeth 61 (see FIG. 2) of the drive sprocket 63 and thus are subjected to the greatest wear. The flat sections 44, 46 and 48 are substantially flush with the inner peripheral surface 14.

Referring to FIG. 5 a typical lay up for forming a track has been illustrated. The outer layer 1 is of rubber followed by a layer of cord 2, a second layer of rubber 3, a second layer of cord 4 and a third layer of rubber 5. The raised sections 50 project through the layer 5 and almost up to the layer 2 so that the layers 3, 4 and 5 are discontinuous. A layer of rubber 7 followed by a layer of cord 8 and another layer of rubber 9 fill the volume under the raised sections 50 and firmly anchor the member 42 in position. In the final moulded track the flat sections 44, 46 and 48 are visible from the inner peripheral surface 14.

While the invention has been discussed above only in relation to one specification, persons skilled in the art will be aware that it may be refined and modified in various ways without departing from its scope. For example, an H-shaped or U-shaped clip structure could easily be envisaged instead of the above-described W-shaped clip 52. It is therefore wished to have it understood that this invention is not limited in interpretation except by the terms of the following claims.

We claim:

1. A track for a lightweight vehicle, said track having a tread surface and an inner peripheral surface, said track provided with a pair of laterally spaced rows of sprocket-teeth-receiving holes with each hole having a front and a rear surface and with each hole extending through said track, a plurality of reinforcing members each embedded in said track and each extending transversely of said track and traversing said rows between adjacent said holes, a pair of clips secured to each of said reinforcing members, each said clip having a bridging member connected to its reinforcing member with a pair of upstanding arms depending from the bridging member, each of said clips located in said rows between said adjacent holes with said arms forming the front and rear surfaces of said adjacent holes, each of said reinforcing members being substantially flat with a pair of raised sections, said bridging members connected to said reinforcing members at said raised sections, said raised sections connecting each of said reinforcing members into three separate flat sections, said flat sections substantially flush with said inner peripheral surface.

2. A track as defined in claim 1 wherein said clips are substantially W-shaped with each of said arms folded as one of the U's and the bridging member connected therebetween.

3. A track as defined in claim 1 wherein said tread surface has a tread design comprising a pair of peripheral bands located between said rows and the adjacent lateral edges of said track, said bands being formed by a plurality of parallel lands and grooves extending at an acute angle to said rows.

4. A track as defined in claim 1 wherein said tread surface has a tread design comprising a pair of peripheral bands located between said rows and the adjacent lateral edges of said track, said bands being formed by a plurality of parallel lands and grooves extending at an acute angle to said rows, spaced ridges extending transversely of said track between said bands and located directly above said reinforcing members, said ridges projecting above said lands.

5. A track as defined in claim 1 wherein said tread surface has a tread design comprising a pair of peripheral bands located between said rows and the adjacent lateral edges of said track, said bands being formed by a plurality of parallel lands and grooves extending at an acute angle to said rows, spaced ridges extending transversely of said track between said bands and located directly above said reinforcing members, said ridges projecting above said bands and a longitudinally extending rib separating each of said bands from its adjacent said row.

6. A track as defined in claim 1 wherein said tread surface has a tread design comprising a pair of peripheral bands located between said rows and the adjacent lateral edges of said track, said bands being formed by a plurality of parallel lands and grooves extending at an acute angle to said rows, spaced ridges extending transversely of said track between said bands and located directly above said reinforcing members, said ridges projecting above said bands, a longitudinally extending rib separating each of said bands from its adjacent said row, a second pair of bands extending inwardly one from each of said rows, each of said second pair of bands terminating laterally in longitudinal extending ribs.

References Cited
UNITED STATES PATENTS

| | | | |
|---|---|---|---|
| 3,451,729 | 6/1969 | Roy | 305—38 |
| 3,436,128 | 4/1969 | Boulanger | 305—38 |
| 3,416,845 | 12/1968 | Scanland | 305—38 |
| 2,449,421 | 9/1948 | Slemmons | 305—38 |

RICHARD J. JOHNSON, Primary Examiner